United States Patent [19]

Batzel

[11] Patent Number: 5,491,213

[45] Date of Patent: Feb. 13, 1996

[54] PRODUCTION OF POLYSUCCINIMIDE

[75] Inventor: Daniel A. Batzel, Skokie, Ill.

[73] Assignee: Donlar Corporation, Bedford Park, Ill.

[21] Appl. No.: 188,525

[22] Filed: Jan. 28, 1994

[51] Int. Cl.$^6$ .................. C08G 69/10; C07D 207/404
[52] U.S. Cl. ............... 528/480; 528/322; 528/328; 528/345; 528/363; 528/367; 528/392; 526/204; 526/210; 526/212; 526/213; 526/225; 526/304; 525/418; 525/419; 525/420; 525/539; 548/520
[58] Field of Search ............... 548/520; 528/480, 528/363, 367, 392, 315, 317, 318, 322, 328, 345; 525/418, 419, 420, 539; 562/565; 526/204, 210, 212, 213, 225, 304

[56] References Cited

U.S. PATENT DOCUMENTS

| | | | |
|---|---|---|---|
| 4,839,461 | 6/1989 | Boehmke | 528/363 |
| 5,219,952 | 6/1993 | Koskan et al. | 525/419 |
| 5,292,858 | 3/1994 | Wood | 528/363 |
| 5,367,047 | 11/1994 | Wood | 528/363 |
| 5,371,177 | 12/1994 | Paik et al. | 528/361 |
| 5,371,179 | 12/1994 | Paik et al. | 528/363 |
| 5,371,180 | 12/1994 | Groth et al. | 528/363 |
| 5,373,088 | 12/1994 | Koskan et al. | 528/363 |

*Primary Examiner*—Joseph K. McKane
*Attorney, Agent, or Firm*—Olson & Hierl, Ltd.

[57] ABSTRACT

Polysuccinimide is prepared by reacting an unsaturated $C_2$ dicarboxylic acid or anhydride thereof, e.g., maleic acid, fumaric acid, and maleic anhydride, with a particulate ammonium salt that is thermally decomposable to liberate ammonia. The reaction is carried out at a temperature which is above the thermal decomposition temperature of the ammonium salt and for a time period which is sufficient for the acid or anhydride to react with the ammonia liberated from the ammonium salt and for polymerization to occur. The present method avoids the prior art problems of controlling ammonia losses and water removal. The product polysuccinimide can be readily hydrolyzed to polyaspartic acid or a salt thereof, if desired.

3 Claims, 1 Drawing Sheet

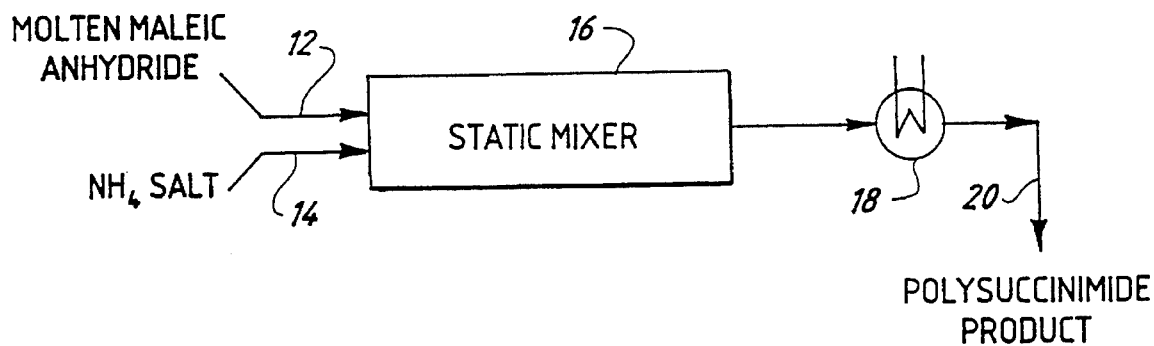
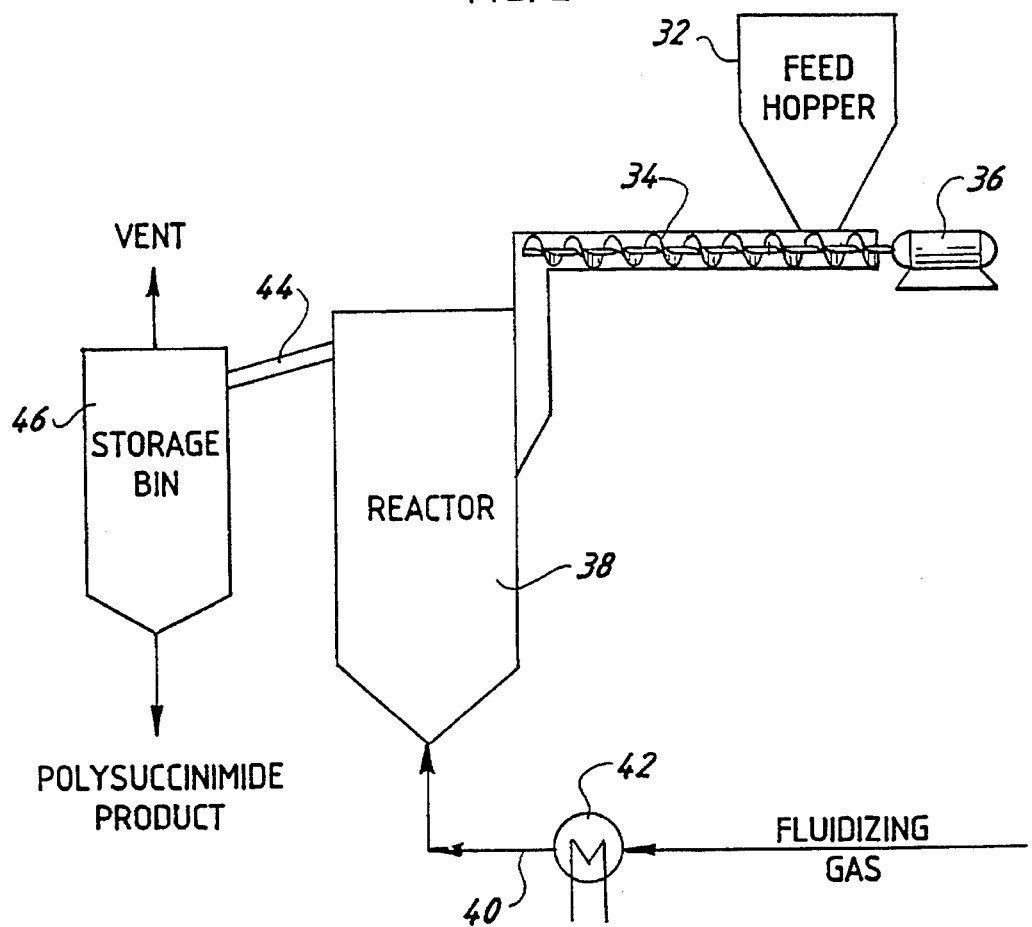

PRODUCTION OF POLYSUCCINIMIDE

FIELD OF THE INVENTION

This invention relates to a method for the production of polysuccinimide.

BACKGROUND OF THE INVENTION

It is known that polysuccinimide can be produced by reacting maleic anhydride, water and ammonia at a molar ratio of maleic anhydride to ammonia of 1:1 to 1.5 at 120° to 150° C. (Boehmke U.S. Pat. No. 4,839,461), or by first reacting maleic anhydride, water and ammonia below 150° C. and then polymerizing that reaction product with a preformed polysuccinimide at a higher temperature (Koskan et al. U.S. Pat. No. 5,219,952). The polysuccinimide can be base hydrolyzed to polyaspartic acid, a compound suitable as an antideposition agent, and as a plant nutrient uptake facilitator. Polysuccinimide itself is useful as a builder for detergent compositions and also as an antideposition agent.

Such prior art processes suffer from various disadvantages, however. For one thing, they are capital intensive, energy intensive, and time consuming because the maleic anhydride is mixed with water at elevated temperature, the ammonia is added in a manner minimizing ammonia loss, and the water of solution is evaporated with vacuum or heating. Also, expensive ammonia handling equipment is needed at all stages of the reaction.

The art needs a new and improved method for producing polysuccinimide which overcomes these disadvantages.

SUMMARY OF THE INVENTION

Polysuccinimide is prepared by combining a thermally decomposable ammonium salt with a unsaturated $C_2$ dicarboxylic acid or anhydride, e.g., maleic anhydride, maleic acid, fumaric acid, or mixtures thereof, at a reaction temperature that is above the thermal decomposition temperature of the ammonium salt. Preferably the reaction temperature is below the boiling point of maleic anhydride. As used herein, and in the appended claims, "thermal decomposition temperature" is the temperature at which ammonia exchange between the salt and the dicarboxylic acid or its anhydride begins to occur. The produced reaction product is then polymerized to a polysuccinimide at a temperature in the range of about 150° C. to about 300° C.

More particularly, the method preferably utilizes a series of steps. In a first step, a reaction admixture is formed by combining a particulate ammonium salt that is thermally decomposable to liberate ammonia with the aforesaid unsaturated $C_2$ dicarboxylic acid or anhydride.

Next, the so formed admixture is heated to a reaction temperature that is sufficient to release ammonia from the ammonium salt.

Thereafter, the so heated mixture is maintained at such a reaction temperature for a time period sufficient to react at least a portion of the unsaturated $C_2$ dicarboxylic acid or anhydride with the ammonia liberated from the ammonium salt to produce a reaction product which is then polymerized. The foregoing steps can be carried out seriatim or concurrently as desired.

The inventive method overcomes the problems associated with the above-indicated prior art methods of making polysuccinimide by avoiding the need to add an ammonia solution under conditions which avoid ammonia loss and by avoiding the need to evaporate the water of solution.

In practicing the present invention, the reaction mixture can be heated to the indicated reaction temperatures in an open reactor. The ammonia that is liberated from its salt upon heating is quickly combined with the dicarboxylic acid or anhydride instead of being lost to the environment inasmuch as the ammonia exchange takes place in situ.

The inventive method preferably is practiced under generally anhydrous conditions so that substantial water addition and water removal are circumvented.

By using a preferred mole ratio of the acid or anhydride moiety to the ammonium group of the ammonium salt that is about 1:1, relatively high yields of polysuccinimide product are obtained.

If desired, the product polysuccinimide can be base hydrolyzed to polyaspartic acid.

Other and further objects, aims, purposes, features, advantages, embodiments and the like will be apparent to those skilled in the art from the present specification taken with the accompanying drawings and the appended claims.

BRIEF DESCRIPTION OF THE DRAWINGS

In the drawings,

FIG. 1 is a schematic diagram of a process embodiment suitable for reacting molten maleic anhydride with an ammonia source such as a thermally decomposable ammonium salt; and FIG. 2 is a schematic diagram of a process embodiment suitable for reacting solid particulate reactants to produce polysuccinimide.

DETAILED DESCRIPTION OF PREFERRED EMBODIMENTS

In the preferred practice of this invention, one first forms a reaction mixture by combining a particulate ammonium salt with an unsaturated $C_2$ dicarboxylic acid or the anhydride thereof, e.g., with maleic acid, maleic anhydride, fumaric acid, and mixtures thereof. Preferred starting reactants are maleic acid and maleic anhydride. However, the term "unsaturated $C_2$ dicarboxylic acid or anhydride" also includes substituted such moieties. In particular, the contemplated starting materials in acid form can be represented by the formula

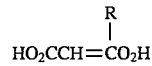

wherein R can be hydrogen, an alkyl group containing up to and including 8 carbon atoms, or a halo group (i.e., chloro, bromo, fluoro or iodo).

The ammonium salt is thermally decomposable, preferably at a temperature below the boiling point of liquid (molten) maleic anhydride and a temperature that is above the melting point of maleic anhydride. Although the particle size of the particulate starting materials can vary widely, e.g., from powders to pellets, a present preference is to employ solid reactants having a mean particle size that is below about 1000 microns.

The particulate ammonium salt can be inorganic or can be the salt of an organic acid. Examples of suitable inorganic ammonium salts and suitable organic acid salts are shown in Tables I and II, respectively, below.

TABLE I

DECOMPOSABLE AMMONIUM SALTS (INORGANIC)

| Name | Formula | Decomposition Temperature |
| --- | --- | --- |
| ammonium carbonate | $(NH_4)_2CO_3$ | 58° C. |
| ammonium bicarbonate | $(NH_4)HCO_3$ | 36–60° C. |
| ammonium sulfite | $(NH_4)SO_3.H_2O$ | 60–70° C. |
| ammonium sulfate | $(NH_4)_2SO_4$ | 235° C. |
| ammonium sulfamate | $NH_4OSO_2NH_2$ | 160° C. |
| ammonium thiocyanate | $NH_4SCN$ | 170° C. |
| ammonium carbamate | $NH_4CO_2NH_2$ | sublimes at 60° C., decomposes in air |
| ammonium peroxydisulfate | $(NH_4)_2S_2O_8$ | 120° C. |
| ammonium chloride | $NH_4Cl$ | sublimes at 340° C.; liberates $NH_3$ upon boiling |
| ammonium orthophosphate | $(NH_4)_2HPO_4$ | 155° C. |
| ammonium orthophosphite | $(NH_4)_2HPO_3$ | 145° C. |
| ammonium thiosulfate | $(NH_4)_2S_2O_3$ | 150° C. |
| ammoniated superphosphate | complex of about 5 parts of $NH_3$ per 100 parts superphosphate (substantially tribasic Ca phosphate) | |
| ammonium monosulfide | $(NH_4)_2S$ | |
| ammonium hydrosulfide | $NH_4HS$ | |
| ammonium cyanide | $NH_4CN$ | 36° C. |

TABLE II

DECOMPOSABLE AMMONIUM SALTS (ORGANIC)

| Name | Formula | Decomposition Temperature |
| --- | --- | --- |
| ammonium acetate | $NH_4CO_2CH_3$ | 110°–112° C. |
| ammonium formate | $NH_4CHO_2$ | 180° C. |
| ammonium bitartrate | $(NH_4)HC_4H_4O_6$ | |
| ammonium benzoate | $C_6H_5COONH_4$ | 198° C. |
| ammonium caprylate | $CH_3(CH_2)_6COONH_4$ | mp 75° C.; decomposes at room temperature |
| ammonium oxalate | $(NH_4)_2C_2O_4.H_2O$ | 133° C. |
| ammonium gluconate | $NH_4C_6H_{11}O_7$ | |

Presently preferred decomposable ammonium salts are the inorganic ammonium salts ammonium carbonate, ammonium sulfate, ammonium chloride, ammonium bicarbonate, ammonium phosphate, and mixtures thereof. Maleic anhydride is the preferred starting reactant. Maleic anhydride in a powdered state is combined with the starting ammonium salt in a powdered state by any conventional mechanical mixing means.

The so formed starting mixture is then heated to a temperature of reaction that preferably ranges from above about the melting point of maleic anhydride to below about the boiling point of maleic anhydride to produce a reaction product that is then polymerized. The temperature of the reaction is also above the thermal decomposition temperature of the ammonium salt. A present preference is to employ a temperature in the range of about 55° C. to about 200° C., although higher and lower temperatures can be employed, if desired.

The so heated admixture is maintained at such a reaction temperature for a time period that is sufficient to react the $C_2$ dicarboxylic acid or its anhydride with the ammonia liberated by the thermal decomposition of the ammonium salt. Characteristically, the ammonia thus liberated from its salt is quickly combined, and no significant amount of ammonia is lost to the environment when the reaction is conducted in an open vessel. If desired, the initial starting material admixture can contain a thermal decomposition promoter for the ammonium salt. For example, if ammonium chloride is one of the starting reactants, sodium hydroxide can be included in the admixture to promote ammonia release.

Typically, a substantially complete reaction results within a time period ranging from about 15 minutes to about four hours. Preferably, a starting mixture is so heated for a time of at least about 2 hours.

Polymerization of the obtained reaction product can be effected at a temperature in the range of about 150° C. to about 300° C. Thus, if the initial reaction is carried out at a temperature within the aforementioned range, polymerization can be substantially concurrent with the ammonia exchange reaction. Alternatively, the ammonia exchange reaction and the polymerization reaction can be carried out as separate process steps.

After the polymerization reaction is terminated and the heating is discontinued, the reaction mass cools into a solid, brittle substantially uniform polysuccinimide reaction product.

A mole ratio of about 1:1 is presently preferred; however, the molecular weight of the polymer product can be varied by varying the mole ratio as illustrated by Table III, below.

The solidified product can be broken up into a particulate mass by any conventional procedure, e.g., grinding.

Preferably, the amount of free water (moisture) present in a starting mixture of maleic anhydride and ammonium salt is less than about 5 weight percent (based on total weight of starting mixture). Relatively high amounts of water are undesirable because of caking.

If desired, the reaction mixture can additionally contain maleic acid and/or fumaric acid.

The polysuccinimide reaction product can be used per se, or it can be combined with aqueous ammonium hydroxide, sodium hydroxide, sodium carbonate, and the like, and base hydrolyzed to produce polyaspartic acid salts. Base hydrolysis can be carried out under a wide variety of conditions, but preferably is effected at a pH value of at least about 8 and higher, and at a temperature below about 80° C.

Alternatively, the thermally decomposable ammonium salt can be combined with molten maleic anhydride to effect the desired conversion to an ammonium maleate. The reaction admixture of the ammonium salt and liquid maleic anhydride (melting point about 55° C.) can then be heated so as to elevate the temperature thereof and initiate, as well as maintain, the ammonia exchange reaction and the subsequent polymerization to polysuccinimide.

Referring to the drawings, FIG. 1 illustrates a process embodiment of the present invention using molten maleic anhydride and a thermally decomposable ammonium salt. Both reactants are fed by means of respective conduits 12 and 14 to static mixer 16 where the introduced reactants are intimately mixed. Depending upon the temperature in static mixer 16, the ammonia exchange and condensation reactions can be initiated within the static mixer, or downstream therefrom by providing additional heat input by means of heater 18. If desired, static mixer 16 can be jacketed to maintain therein the desired reaction temperature in which event downstream heater 18 may be optional. Polysuccinimide product is dispensed via conduit 20.

FIG. 2 illustrates a process embodiment of the present invention using both reactants in particulate solid form. In particular, a particulate solid admixture of both reactants is contained in feed hopper 32 that feeds screw conveyor 34 driven by motor 36. Screw conveyor 34, in turn, transports the solid reactant admixture to reactor 38 which can be a fluidized bed reactor, a spouting bed reactor, or the like. The reactant admixture introduced into reactor 38 is fluidized and heated, usually by means of a hot fluidizing gas that enters reactor 38 via conduit 40. Heat input to the fluidizing gas can be provided by heater 42 upstream from reactor 38. If desired, the solid reactant admixture can be preheated while in the screw conveyor. Alternatively, screw conveyor 34 can also serve as a reactor in which case a separate reactor 38 may be eliminated or downsized to perform primarily a cooling and drying function.

Reaction product, i.e., polysuccinimide, is transported by the fluidizing gas via conduit 44 to storage bin 46 that can be equipped with one or more cyclones for effective gas-solid separation. Thereafter the fluidizing gas can be vented through vent conduit 48 or recycled, as desired. Polysuccinimide product is dispensed from storage bin 46 via product conduit 50.

Hydrolysis can also be effected by water at elevated temperature and pressure, e.g., by using saturated steam at 150° C.

The following Examples further illustrate the invention:

EXAMPLES 1–9

Maleic anhydride powder and ammonium carbonate powder were mixed at different ratios in a mortar (Examples 1–6, 8 and 9). The mixtures were loaded into separate "Pyrex" glass volumetric flasks (100 mL) ("Pyrex" is a trade mark of the Corning Glass Works for a brand of heat stable glass). In Example 7, only maleic anhydride was added to the volumetric flask. Quantities and ratios were as given in Table III below. Stoppers with a single hole were used to vent the flasks.

Two oil baths were used to heat the flasks. The oil temperature in each of the baths was initially room temperature. The flasks in Examples 1, 3 and 7 were placed in one bath (Bath A) while the flasks in examples 2, 4, 8 and 9 were placed in another similar oil bath (Bath B). The temperatures of the oil in each bath were recorded using thermometers.

The oil bath temperature was elevated by heating. Bath A was heated to 200° C. over a period of 50 minutes. Bath B was heated to 240° C. over a period of 50 minutes. At the moment when Bath A reached 200° C., the flask representing Example 5 was immersed in Bath A. Similarly, once Bath B reached 240° C., the flask representing Example 6 was immersed in Bath B.

The flasks in Bath A (Examples 1, 3, 5 and 7) were kept at 200° C. for 2 hours and then removed and allowed to cool to room temperature.

The flasks in Bath B (Examples 2, 4, 6, 8 and 9) were kept at 240° for 2 hours and then removed and allowed to cool to room temperature.

The polysuccinimide products as confirmed by infrared spectroscopy thus produced in each of Examples 1–6, 8 and 9 were weighed and yield was calculated.

A portion of each of these products was hydrolyzed to sodium polyaspartic acid by dissolving the product (0.3 g) in 1N NaOH (3 g) at ambient temperature. Next, 1 g of the hydrolyzed product in solution was combined with 9 g of 0.1M $KH_2PO_4$ buffer solution. Each resultant buffered product was analyzed for peak molecular weight (Mp) using Gel Permeation Chromatography (GPC) with polyacrylic acid standards.

The product of Example 7 was hydrolyzed using the method above and a portion of the obtained product (1 g) was diluted with 9 g 0.1M $KH_2PO_4$ solution and was analyzed for molecular weight by GPC. Only monomer was detected by GPC.

The noted molecular weights are reported in Table III, below.

TABLE III

RESULTS FOR AMMONIUM CARBONATE - MALEIC ANHYDRIDE

| Example | Maleic Anhydride (g) | Ammonium Carbonate (g) | Mole Ratio Anhydride:$NH_3$[a] | Weight Loaded Into Flask (g) | Final Bath Temp (°C.) Time (h) | Product (g) | Yield[b] (%) | Peak MW (Mp) |
|---|---|---|---|---|---|---|---|---|
| 1. | 5.0475 | 3.8869 | 1:1.6 | 8.6513 | 200;2 | 5.0433[c] | 104 | 1811 |
| 2. | 5.0083 | 3.8848 | 1:1.6 | 8.6936 | 240;2 | 5.7341 | 118 | 2125 |
| 3. | 4.9995 | 2.9140 | 1:1.2 | 7.7775 | 200;2 | 4.9647 | 102 | 3192 |
| 4. | 5.0177 | 2.9228 | 1:1.2 | 7.8622 | 240;2 | 4.9556 | 101 | 3515 |
| 5. | 5.0016 | 2.9144 | 1:1.2 | 7.8059 | 200;2 | 4.9164 | 101 | 3260 |
| 6. | 5.0095 | 2.9148 | 1:1.2 | 7.7848 | 240;2 | 4.8029 | 99 | 3427 |
| 7. | 5.0286 | 0 | — | 5.0286 | 200;2 | 5.0008 | 99 | Monomer |
| 8. | 0197 | 2.3059 | 1.1:1 | 7.1115 | 240;2 | 4.4289 | 89 | 2195 |
| 9. | 5.0490 | 1.8983 | 1.3:1 | 6.8821 | 240;2 | 4.2318 | 85 | 1805 |

[a]Based on available $NH_3$ contained in ammonium carbonate

TABLE III-continued

RESULTS FOR AMMONIUM CARBONATE - MALEIC ANHYDRIDE

| Example | Maleic Anhydride (g) | Ammonium Carbonate (g) | Mole Ratio Anhydride:NH$_3$[a] | Weight Loaded Into Flask (g) | Final Bath Temp (°C.) Time (h) | Product (g) | Yield[b] (%) | Peak MW (Mp) |
| --- | --- | --- | --- | --- | --- | --- | --- | --- |

[b] Yields for examples 1–6, 8, 9 are based on 100% conversion to polysuccinimide. Yield for example 7 is based on no reaction.
[c] A small portion of the product was lost due to excessive frothing over opening of container.

EXAMPLES 10–13

In Examples 10–13, mixtures of maleic anhydride and respective salts of selected ammonium compounds were blended in a mortar. Quantities and ratios were as given in Table IV. A portion of each mixture was placed in a separate unstoppered test tube. The test tubes were placed in a room temperature oil bath.

The temperature of the oil of the bath was increased to 150° C. over a 90 minute period and kept at this temperature for two hours. After this time, the test tubes representing Example 12 were removed and allowed to cool to room temperature. Next, the temperature of the bath was increased from 150° C. to 200° C. over a sixty minute period, and kept at 200° C. for 1.3 hours. After this time, the test tubes representing Examples 10, 11 and 13 were removed and allowed to cool to room temperature under ambient conditions.

The polysuccinimide products, as confirmed by infrared spectroscopy, thus produced from Examples 10–13 were weighed and yield was calculated. A portion of each of the products was hydrolyzed to sodium polyaspartic acid using an aqueous sodium hydroxide solution in a manner similar to that described in Examples 1–9, above.

Molecular weights of all products were obtained using Gel Permeation Chromatography using the same methods as above described in Examples 1–6, 8 and 9. The noted results are reported in Table IV, below.

EXAMPLES 14 & 15

In examples 14 and 15, maleic anhydride was mixed with ammonium phosphate dibasic, $(NH_4)_2HPO_4$, in a mortar. The resulting mixtures were placed in unstoppered test tubes. The test tubes were then placed in an oil bath set at 50° C.

The temperature of the oil bath was increased to 220° C. over a period of 1.75 hours. The test tubes were kept at 220° C. for 0.75 hours. After this time the test tubes were removed from the oil bath and allowed to cool to room temperature.

The products were confirmed to be polysuccinimide by infrared spectroscopy. Portions of the products were hydrolyzed to sodium polyaspartic acid. Molecular weights were obtained using GPC using the same method as in examples 1–6, 8 and 9. Noted results, as well as reactant quantities and ratios, are reported in Table IV, below.

EXAMPLE 16

Ammonium carbonate (1.50 g; $1.56 \times 10^{-2}$ mol) was added to a test tube. Next, liquid maleic anhydride (2.5 g; $2.55 \times 10^{-2}$ mol) was added to the ammonium carbonate. The maleic anhydride solidified on the surface of the ammonium carbonate. Next, the test tube was placed in an oil bath at room temperature. The oil bath temperature was increased to 240° C. over a period of 1.5 hours. The test tube was kept in the oil bath at 240° C. for 2 hours, removed, and allowed to cool to room temperature.

The obtained product was a brown colored foam. It weighed 1.833 g. The product was identified by infrared spectroscopy as a polysuccinimide. The yield was 74%. A portion of the product was hydrolyzed to sodium polyaspartate and its peak molecular weight was determined to be 940 by size exclusion chromatography.

TABLE IV

RESULTS FOR SELECTED AMMONIUM SALTS

| Example | Ammonium Salt; Amount (g) | Maleic Anhydride (g) | Mole Ratio Anhydride:NH$_3$ | Weight Mixture Loaded | Final Temp (°C.) Time (h) | Product (g) | Yield (%) | Peak MW (Mp) |
| --- | --- | --- | --- | --- | --- | --- | --- | --- |
| 10 | $(NH_4)_2SO_4$; 0.6920 | 1.0023 | 1:1 | 0.8394 | 200;1.3 | 0.6214 | 126 | 1057 |
| 11 | $NH_4Cl$; 0.5491 | 1.0061 | 1:1 | 0.6435 | 200;1.3 | 0.3653 | 89 | 1252 |
| 12 | $(NH_4)_2CO_3$; 0.5822 | 1.0009 | 1:1.2 | 0.5574 | 150;2 | 0.2964 | 85 | 1755 |
| 13 | $(NH_4)_2CO_3$; 0.5822 | 1.0009 | 1:1.2 | 0.9248 | 200;1.3 | 0.4918 | 85 | 2233 |
| 14 | $(NH_4)_2HPO_4$; 1.3004 | 1.003 | 1:2 | | 220;0.75 | 0.7902 | 80 | 1083 |
| 15 | $(NH_4)_2HPO_4$; 0.6713 | 1.002 | 1:1 | | 220;0.75 | 0.6630 | 67 | 1066 |

What is claimed is:

1. A method for preparing polysuccinimide which comprises:
   (a) forming a reaction admixture by combining particulate maleic anhydride with a particulate ammonium salt that is thermally decomposable at a temperature below the boiling point of liquid maleic anhydride;
   (b) heating said so formed admixture to a reaction temperature above the thermal decomposition temperature of said ammonium salt but below the boiling point of liquid maleic anhydride; and
   (c) maintaining said so heated admixture at said reaction temperature for a time period of at least about 15 minutes.

2. The method of claim 1 wherein said ammonium salt is an inorganic ammonium salt selected from the group consisting of ammonium carbonate, ammonium sulfate, ammonium chloride, ammonium phosphate, and mixtures thereof.

3. The method of claim 1 wherein, after said maintaining, the resulting mixture is cooled to ambient temperature, is admixed with an aqueous sodium hydroxide solution, and is heated to a temperature below about 80° C. for a time period sufficient to hydrolyze said resulting mixture, thereby converting said polysuccinimide into a sodium salt of polyaspartic acid.

* * * * *